(12) United States Patent
Gussmann

(10) Patent No.: US 10,730,707 B2
(45) Date of Patent: Aug. 4, 2020

(54) CONVEYING DEVICE FOR CONVEYING A WORKPIECE

(71) Applicant: Walter Maschinenbau GmbH, Tübingen (DE)

(72) Inventor: Lukas Gussmann, Reutlingen (DE)

(73) Assignee: WALTER MASCHINENBAU GMBH, Tubingen (DE)

( * ) Notice: Subject to any disclaimer, the term of this patent is extended or adjusted under 35 U.S.C. 154(b) by 115 days.

(21) Appl. No.: 15/758,976

(22) PCT Filed: Aug. 30, 2016

(86) PCT No.: PCT/EP2016/070345
§ 371 (c)(1),
(2) Date: Mar. 9, 2018

(87) PCT Pub. No.: WO2017/054995
PCT Pub. Date: Apr. 6, 2017

(65) Prior Publication Data
US 2018/0339869 A1    Nov. 29, 2018

(30) Foreign Application Priority Data
Sep. 30, 2015   (DE) .................. 10 2015 116 582

(51) Int. Cl.
*B23B 13/00*   (2006.01)
*B23Q 7/04*    (2006.01)
(Continued)

(52) U.S. Cl.
CPC .............. *B65G 49/00* (2013.01); *B23Q 1/54* (2013.01); *B23Q 7/04* (2013.01); *B25J 15/0042* (2013.01);
(Continued)

(58) Field of Classification Search
CPC ...... B23Q 1/54; B23Q 2240/007; B23Q 7/04; B65G 49/00
See application file for complete search history.

(56) References Cited

U.S. PATENT DOCUMENTS 3,339,273 A * 9/1967 Knosp ................ B23Q 3/15526
483/8
4,491,451 A * 1/1985 Willim ..................... B21J 13/08
414/732
(Continued)

FOREIGN PATENT DOCUMENTS

CN          101264604 A     9/2008
CN       202 622 803 U    12/2012
(Continued)

OTHER PUBLICATIONS

German Patent Office, Office Action, Application No. 10 2015 116 582.1, dated Jun. 26, 2019, 8 pages.
(Continued)

*Primary Examiner* — Nicole N Ramos
(74) *Attorney, Agent, or Firm* — Cantor Colburn LLP

(57)    ABSTRACT

The invention relates to a transport device (38) for transporting a workpiece (23) between a clamping chuck (22) and a workpiece carrier (30). The transport device (38) comprises a gripper arrangement (39) with a pivot arm (40). One end of the pivot arm (40) is supported on the machine tool (20) and, in particular, a machine slide (25) via a first pivot drive (41) so as to be pivotable about a first pivot axis (S1). On the other end, the pivot arm (40) supports a second pivot drive (42) that defines a second pivot axis (S2). A workpiece gripper (43) is supported so as to be pivotable about this second pivot axis (S2). The two pivot axes are inclined by 45° relative to each other. A workpiece (23) held by the workpiece gripper (43) has a workpiece longitudinal axis (W) that extends in a first position (I) of the workpiece
(Continued)

Figure 1:
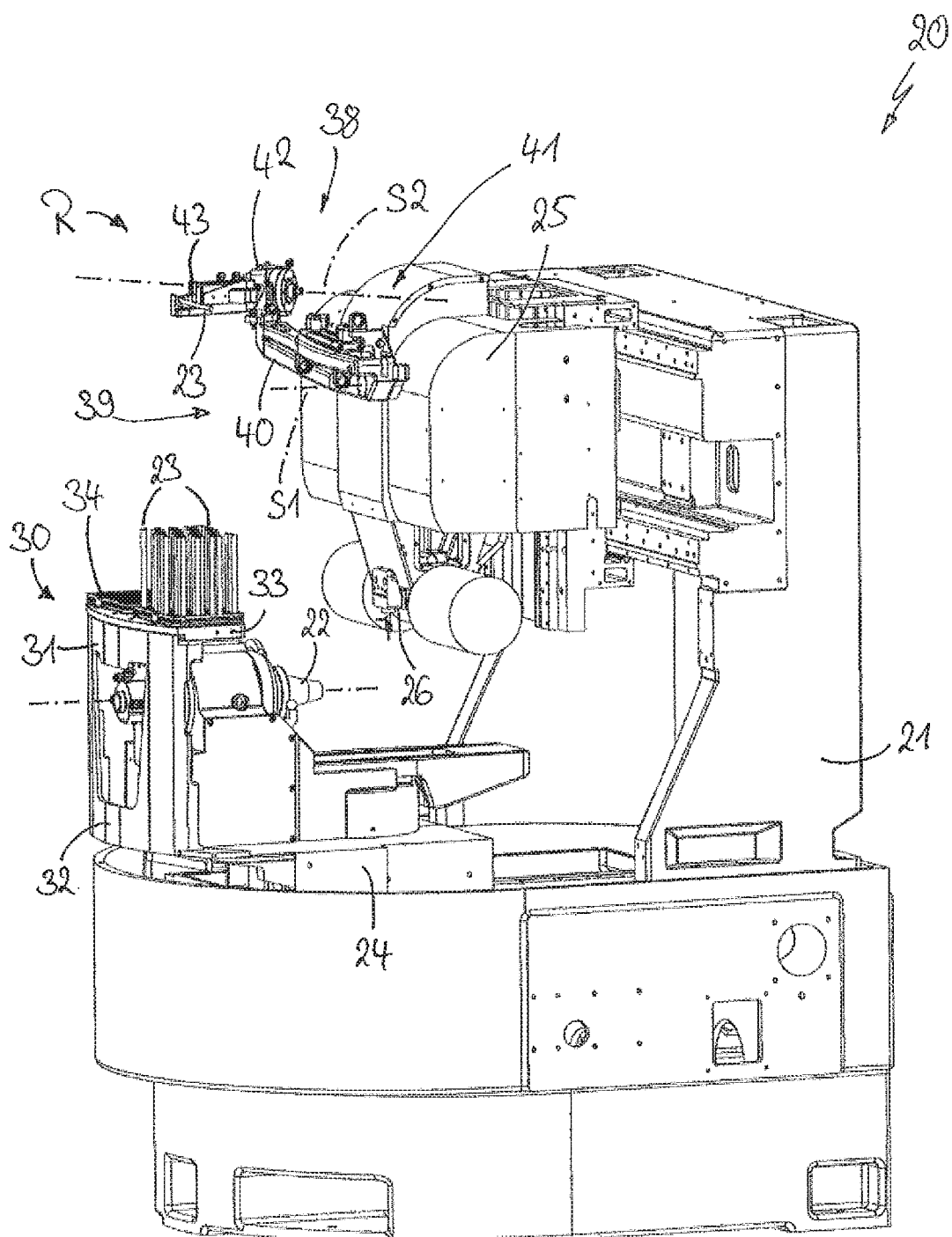

gripper (43) at a right angle with respect to the pivot axis (S1). In a second position (II) of the workpiece gripper (43), the workpiece longitudinal axis (W) is oriented parallel to the first pivot axis (S1). The workpiece longitudinal axis (W) of the workpiece (23) held by the workpiece gripper (43) is inclined by 45° relative to the second pivot axis (S2).

20 Claims, 10 Drawing Sheets

(51) Int. Cl.
| | | |
|---|---|---|
| | *B65G 49/00* | (2006.01) |
| | *B23Q 1/54* | (2006.01) |
| | *B25J 15/02* | (2006.01) |
| | *B25J 15/00* | (2006.01) |
| | *B25J 17/02* | (2006.01) |
| | *B23B 13/10* | (2006.01) |
| | *B23B 13/12* | (2006.01) |

(52) U.S. Cl.
CPC ....... *B25J 15/0293* (2013.01); *B25J 17/0291* (2013.01); *B23B 13/00* (2013.01); *B23B 13/10* (2013.01); *B23B 13/123* (2013.01); *B23Q 2240/007* (2013.01)

(56) References Cited

U.S. PATENT DOCUMENTS

| | | | | | |
|---|---|---|---|---|---|
| 4,608,747 | A | * | 9/1986 | Link | B23B 3/06 408/13 |
| 4,646,422 | A | * | 3/1987 | McMurtry | B23B 31/18 414/736 |
| 4,845,835 | A | | 7/1989 | Schneider | |
| 6,904,652 | B2 | | 6/2005 | Geissler et al. | |
| 8,006,586 | B2 | | 8/2011 | Tealdi et al. | |
| 8,240,971 | B2 | | 8/2012 | Sandmeier | |
| 9,399,288 | B2 | | 7/2016 | Peng et al. | |
| 2004/0173063 | A1 | * | 9/2004 | Trautmann | B23Q 7/04 82/124 |
| 2007/0087924 | A1 | * | 4/2007 | Krosta | B23Q 3/1554 483/1 |
| 2008/0107239 | A1 | * | 5/2008 | Sayeh | A61N 5/10 378/148 |
| 2008/0253876 | A1 | | 10/2008 | Sandmeier | |
| 2008/0271304 | A1 | * | 11/2008 | Grossmann | B23Q 7/04 29/561 |
| 2014/0202276 | A1 | | 7/2014 | Song et al. | |
| 2015/0033898 | A1 | * | 2/2015 | Hsieh | B25J 17/02 74/490.06 |
| 2016/0214805 | A1 | * | 7/2016 | Ebihara | B65G 47/905 |

FOREIGN PATENT DOCUMENTS

| | | |
|---|---|---|
| DE | 1074367 B | 1/1960 |
| DE | 3720180 C1 | 6/1988 |
| EP | 0 087 996 A1 | 9/1983 |
| EP | 1 046 461 A2 | 10/2000 |
| EP | 1 970 171 A1 | 9/2008 |
| EP | 1 982 799 A1 | 10/2008 |
| FR | 2522294 A1 | 9/1983 |
| GB | 889132 | 8/1963 |
| JP | S57054089 A | 3/1982 |
| JP | S59175988 U | 11/1984 |
| JP | S61152603 A | 7/1986 |
| JP | S63-058083 | 3/1988 |
| JP | S6358083 A | 3/1988 |
| JP | H01127203 A | 5/1989 |
| JP | H05301142 A | 11/1993 |
| JP | H0691403 A | 4/1994 |
| JP | H07088702 A | 4/1995 |
| JP | H07-228354 A | 8/1995 |
| JP | 2000317750 A | 11/2000 |
| JP | 2001105203 A | 4/2001 |
| JP | 2007136657 A | 6/2007 |
| JP | 2008260120 A | 10/2008 |
| JP | 2010253644 A | 11/2010 |
| JP | 2011258793 A | 12/2011 |
| TW | 200841986 A | 11/2008 |
| TW | 201424958 A | 7/2014 |
| WO | 2013088548 A1 | 6/2013 |

OTHER PUBLICATIONS

International Searching Authority International Search Report—International Application No. PCT/EP2016/070345, together with the Written Opinion of the International Searching Authority, dated Apr. 10, 2017, 13 pages (In German).

Japanese Patent Office Notice of Reasons for Rejections, Application No. JP2018-513273, dated Mar. 5, 2019, 11 pages (with English translation).

Taiwanese Patent Office Office Action with Search Report—Taiwan Patent Application No. 105131009, dated Oct. 24, 2017, 10 pages (English translation).

Jp Office Action for Application No. JP2018-513273, dated Feb. 28, 2019, 6 Pages.

English Translation JP Office Action for Application No. JP2018-513273, dated Feb. 28, 2019, 9 Pages.

\* cited by examiner

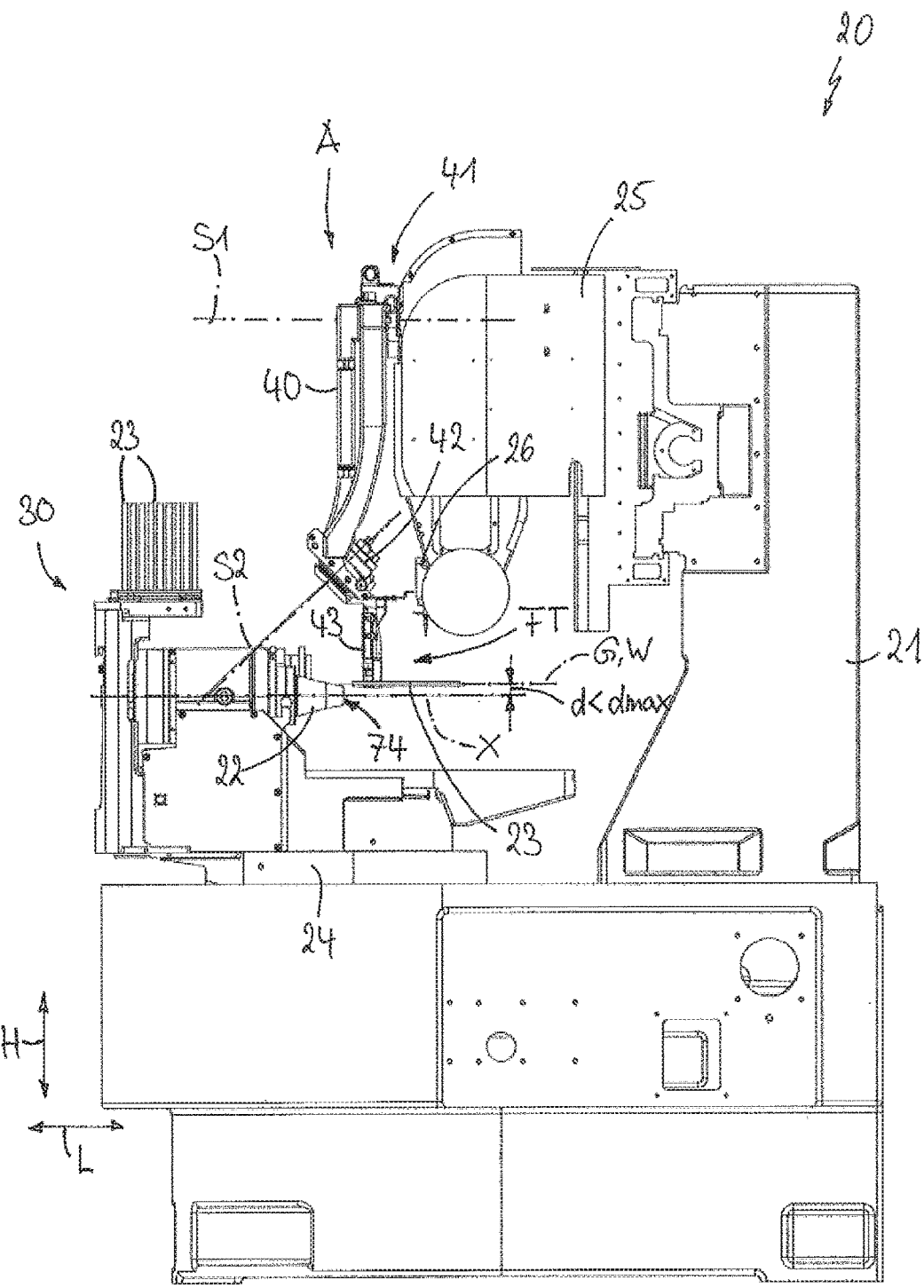
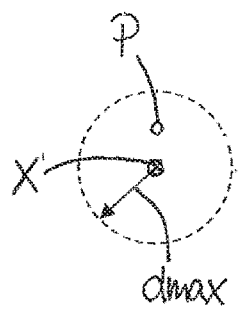
fig. 7
fig. 8

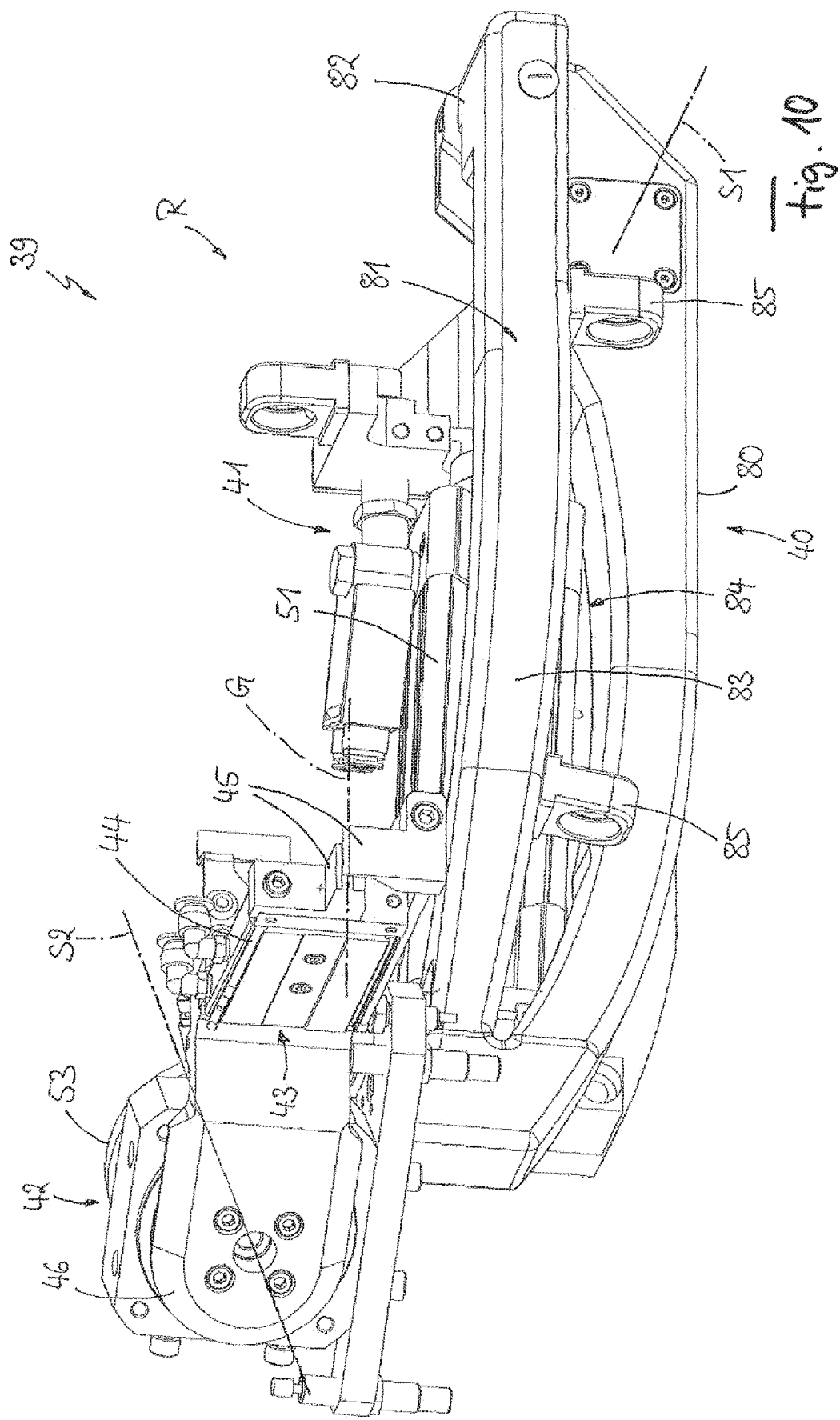

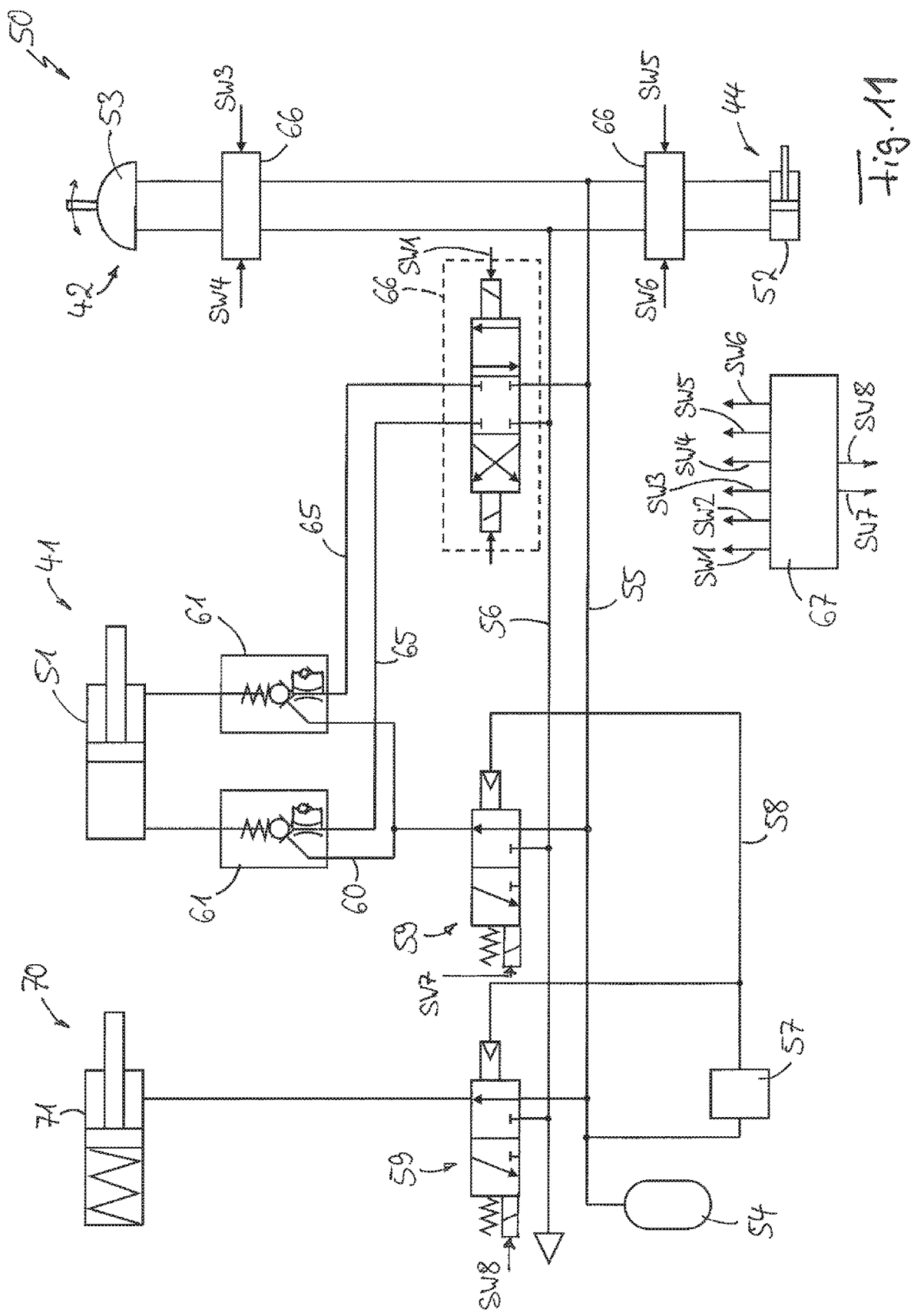

CONVEYING DEVICE FOR CONVEYING A WORKPIECE

The invention relates to a transport device for transporting an at least sectionwise rod-shaped workpiece between a clamping chuck and a workpiece carrier in a machine tool.

From practical applications numerous workpiece changing arrangements have been known. Frequently, grippers or double grippers are used for changing the workpiece.

For example, publication DE 1 074 367 A shows a workpiece changing arrangement with an active magazine that comprises a transport arrangement for transporting the workpieces in a changing position. A double gripper is provided between the magazine and the clamping chuck for clamping the workpiece in place. This double gripper is able to grip the workpiece located in the changing position in the magazine and, at the same time, exchange it due to a 180° pivoting movement.

Active magazines having a dedicated transport unit are complex and, as a rule, require much space. Furthermore, a control system is necessary that activates the transport arrangement of the magazine with the gripping device in a coordinated manner.

Robots having a gripper or double gripper exhibiting a high number of degrees of freedom and are thus suitable for the most varied applications can also be used for changing workpieces, independently of the machine tool.

It is the object of the present invention to provide a transport device for transporting a workpiece between a clamping chuck and a workpiece carrier, in which case said device can be easily integrated in a machine tool.

This object is achieved by a transport device displaying the features of Patent Claim 1.

The transport device according to the invention is disposed to transport an at least sectionwise rod-shaped workpiece between a clamping chuck and a workpiece carrier in a machine tool. Preferably, the entire device, including the workpiece carrier, is arranged so as to be an integral part within a machine housing.

The sectionwise rod-shaped workpiece has a cylindrical section, for example, that may have a circular or polygonal cross-section. Overall, the workpiece may be cylindrical or have another contour adjoining the cylindrical or rod-shaped section. The cylindrical or rod-shaped section is disposed for handling the workpiece and for clamping the workpiece in the clamping chuck.

The transport device comprises a gripper arrangement with a pivot arm. One bearing end of the pivot arm is supported on the machine tool so as to be pivotable by means of a first pivot drive, preferably supported by a slide of the machine tool. The first pivot drive defines a first pivot axis about which the pivot arm can be pivoted. On the other free end facing away from the bearing end, the pivot arm supports a second pivot drive. Again, a workpiece gripper for gripping the workpiece is arranged on the second pivot drive. The workpiece gripper is supported so as to be pivotable about a second pivot axis relative to the pivot arm by means of the second pivot drive.

A control arrangement is disposed for activating the two pivot drives. The first pivot axis extends along a workpiece longitudinal axis. Preferably, the first pivot axis is oriented in horizontal direction. The second pivot axis is inclined by 45° relative to the longitudinal direction. The inclination between the first pivot axis and the second pivot axis is maintained in any pivoting position of the pivot arm.

The workpiece extends along a workpiece longitudinal axis. When the workpiece is held by the workpiece gripper, the workpiece longitudinal axis is inclined by an angle of 45° relative to the second pivot axis. By means of the second pivot drive, it is possible to move the workpiece gripper between a first position and a second position. Preferably, the second pivot drive is rotated by 180° about the second pivot axis. In order to move the workpiece gripper from the first position into the second position and vice versa. The sense of rotation of the second pivot drive is preferably different during the movement between the two positions and depends on whether the first position or the second position is the starting position of the pivoting movement. During the movement between the two position, there is preferably no stop of the second pivot drive provided between the two positions.

In the first position, the workpiece longitudinal axis is oriented at a right angle with respect to the longitudinal direction and, in the second position, it is oriented parallel to the longitudinal direction. The distance of the workpiece gripper from the first pivot axis is smaller in the first position than in the second position. By moving the workpiece gripper from the first position into the second position, the orientation of the workpiece longitudinal axis is changed by 90°, on the one hand, and said workpiece is moved in a height direction at a right angle with respect to the longitudinal direction, on the other hand. As a result of this, the height difference between the workpiece carrier on one side and the clamping chuck on the other side can be overcome very quickly. The workpiece moves along a path that corresponds to a section of the lateral surface of a truncated cone. This movement of the workpiece may take place very quickly with the use of the second pivot drive and thus allows a rapid bridging of the distance between the workpiece carrier and the clamping chuck while, at the same time, the position of the workpiece longitudinal axis is changing. At least one already present machine axle of the machine tool can be used for fine adjustment of the orientation of the workpiece longitudinal axis along a clamping axis of the clamping chuck as well as for mounting the workpiece in the clamping chuck.

Preferably, the gripper arrangement comprises only the two pivot drives and a gripper drive on the workpiece gripper by means of which the workpiece can be clamped in place. All other required movements are performed via the machine axles of the machine tool.

Preferably, all drives of the gripper arrangement are strictly pneumatically configured. The two pivot drives, as well as the gripper drive, are supplied and charged in a controlled manner with compressed air via a pneumatic arrangement or a pneumatic drive arrangement. Preferably, there are no hydraulic drives and electric motors. Electric drives are specifically provided only to the extent as needed as pneumatic component between the switching positions or locations.

It is advantageous if the workpiece carrier has several receiving spaces for one workpiece, respectively. The receiving spaces are configured in such a manner that the workpiece longitudinal axis of a workpiece arranged in a receiving space extends approximately in height direction at a right angle with respect to the longitudinal direction or the first pivot axis. The receiving spaces of the workpiece carrier are preferably arranged in height direction above the clamping axis of the clamping chuck. For example, the workpiece carrier may have a workpiece shelf having a horizontal shelf surface. One or more magazine pallets with the receiving spaces may be arranged on this shelf space.

It is advantageous if the workpiece gripper defines a gripper axis in a manner such that the workpiece longitudinal axis of a workpiece held by the workpiece gripper coincides with the gripper axis. Preferably, the gripper axis is inclined—independently of the rotary position of the workpiece gripper—about the second pivot axis, always by 45° relative to the second pivot axis.

It is advantageous if the workpiece gripper has two gripper jaws that can be moved relative to each other. One gripper jaw or both gripper jaws can be moved in a linear direction or be pivoted relative to each other. The gripper drive is disposed to move at least one gripper jaw. Each of the gripper jaws has one or more clamping locations extending in the direction of the gripper axis. For example, the gripper jaws may have one or more contact surfaces. The cylindrical section of the workpiece is in linear or planar contact with the clamping locations in the direction of the gripper axis. Preferably, at least one of the gripper jaws has a groove-shaped prismatic recess extending in the direction of the gripper axis, wherein said recess may have a V-shaped cross-section.

For transporting a workpiece, the pivot arm is in a working position. In doing so, said pivot arm extends—starting from the first pivot axis—essentially in height direction toward the workpiece carrier or the clamping chuck. In a rest position, the pivot arm extends—starting from the first pivot axis—in approximately a transverse direction that is oriented at a right angle with respect to the height direction and at a right angle with respect to the longitudinal direction. In its rest position, the pivot arm is pivoted relative to the height direction at least by an angle of at least 45° and preferably at least 70° to 80°.

It is advantageous if the gripper axis, in the first position, is oriented parallel to the workpiece longitudinal axis of a workpiece arranged in the receiving space of the workpiece carrier. As a result of this, the workpiece can be positioned between the gripper jaws and gripped or deposited in the magazine by means of a simple linear movement of the machine axle that moves the gripper arrangement and the workpiece carrier relative to each other. Each of the receiving spaces of the workpiece carrier may have a receiving hole whose longitudinal axis is oriented in height direction.

Furthermore, it is advantageous if the pivot arm is arranged by means of the first pivot drive on a machine slide of the machine tool. The machine slide can be moved—via the at least one machine axle with respectively one degree of freedom relative to the clamping chuck and the workpiece carrier. Preferably, the machine slide can be moved within one or two degrees of freedom in linear direction via respectively one machine axle. In one exemplary embodiment, the machine slide can be moved via two machine axles in height direction, as well as in transverse direction.

Furthermore, at least one machine axle may be available for moving the clamping chuck within respectively one degree of freedom relative to the pivot arm. Preferably, the clamping chuck can be moved via one machine axle within one linear degree of freedom in longitudinal direction. Furthermore, an axis of rotation may act as the machine axle by means of which the clamping chuck can be moved in a rotary manner about an axis of rotation extending in height direction.

In one exemplary embodiment, the control arrangement is disposed to activate at least one machine axle for transporting the workpiece. In doing so, this may be a machine axle for moving the machine slide and/or for moving the clamping chuck relative to the machine frame of the machine tool.

Furthermore, the control arrangement may be disposed to transport a workpiece that has been removed from the workpiece carrier by means of at least one machine axle into a pivot transfer position. In the pivot transfer position, the workpiece gripper is in its first position. In do doing, the workpiece longitudinal axis may extend in height direction and may intersect the second pivot axis in a point of intersection. The workpiece longitudinal axis and the second pivot axis may also be arranged skewed relative to each other, in which case the point of intersection results in a common plane due to a projection of the workpiece longitudinal axis and the second pivot axis, said plane being formed by the height direction and the longitudinal direction. The point of intersection is located in the pivot transfer position in longitudinal direction, preferably behind the clamping opening of the clamping chuck into which the workpiece is to be inserted.

Preferably, the clamping axis of the clamping chuck is oriented in longitudinal direction when a workpiece is inserted into clamping opening or when a workpiece is removed from the clamping opening. Furthermore, it is possible for the clamping axis of the clamping chuck to intersect the point or intersection or display a maximum distance from this point of intersection. As a result of this, it is possible to accomplish a rough adjustment of the workpiece to be clamped in the clamping chuck by only the pivoting movement by means of the second pivot drive between the first position and the second position. Optionally, a fine adjustment may be performed thereafter with the use of the at least one machine axle in height direction and/or in transverse direction. This fine adjustment can be performed highly accurately with sufficient speed because of the minimal path length.

In a preferred exemplary embodiment, the control arrangement is disposed to move the workpiece that is positioned in the pivot transfer position into a chuck transfer position by means of a pivoting movement by the second pivot drive. In the chuck transfer position, the workpiece longitudinal axis is oriented parallel to the clamping axis of the clamping chuck. For moving the workpiece between the pivot transfer position and the chuck transfer position, preferably only the second pivot drive is used.

The maximum distance that may exist between the clamping axis and the point of intersection is specified in such a manner that the workpiece longitudinal axis can be oriented by means of the at least one existing machine axle within a time period of at the most 1.5 seconds or at the most 1.0 seconds with the required tolerance along the clamping axis. In doing so, the tolerance is, in particular, smaller than 1.0 mm or smaller than 0.5 mm. The maximum distance between the clamping axis and the point of intersection is preferably at most 4.0 cm or at most 2.0 cm or at most 1.0 cm.

Furthermore, it is advantageous if the distance of the workpiece arranged in the pivot transfer position—measured from the point of intersection—is at least as great in height direction as the distance of a clamping opening or a clamping side of the claming chuck from the point of intersection—measured in longitudinal direction. As a result of this, it is ensured that no collision between the workpiece and the clamping chuck may occur due to the pivoting movement by means of the second pivot drive without additional movement of a machine axle.

In one exemplary embodiment the pivot arm has a length of at least 60 to 70 cm. The pivot arm must display great stiffness for a sufficiently accurate positioning of the workpiece gripper. Preferably, the pivot arm has at least two, or exactly two, physically separated arm struts that are connected to each other on both ends of the pivot arm. The arm struts are separated from each other by a gap at least along a center section. The arm struts are connected to each other in the region of the two ends. Thus, a high flexural rigidity in circumferential direction about the first pivot axis, as well as at a right angle thereto, is achieved. Furthermore, the weight of the pivot arm may be reduced at the same time. The arm struts may be embodied as solid bodies or as hollow body profiles.

Furthermore, it is advantageous is at least two of the existing arm struts are arranged offset relative to each other at least along one section in longitudinal direction and/or in a direction radial to the first pivot axis. As a result of this, it is possible—even with very light-weight arm struts having a very small cross-section—to achieve great stiffness of the pivot arm.

In one exemplary embodiment, the arm struts extend at least sectionwise curved between the ends of the pivot arm. The arm struts are at least not completely straight or are only made up of straight sections.

It is advantageous if, in rest position of the pivot arm, the arm struts are arranged adjacent a pneumatic cylinder of the first pivot drive. In doing so, one arm strut may be located in longitudinal direction at one height and in height direction below the pneumatic cylinder. The respectively other arm strut may be located in longitudinal direction in front of and, in height direction, at the height of the pneumatic cylinder. Consequently, in rest position, this results in a highly compact arrangement that requires minimal design space within the machine tool.

Figure 2:
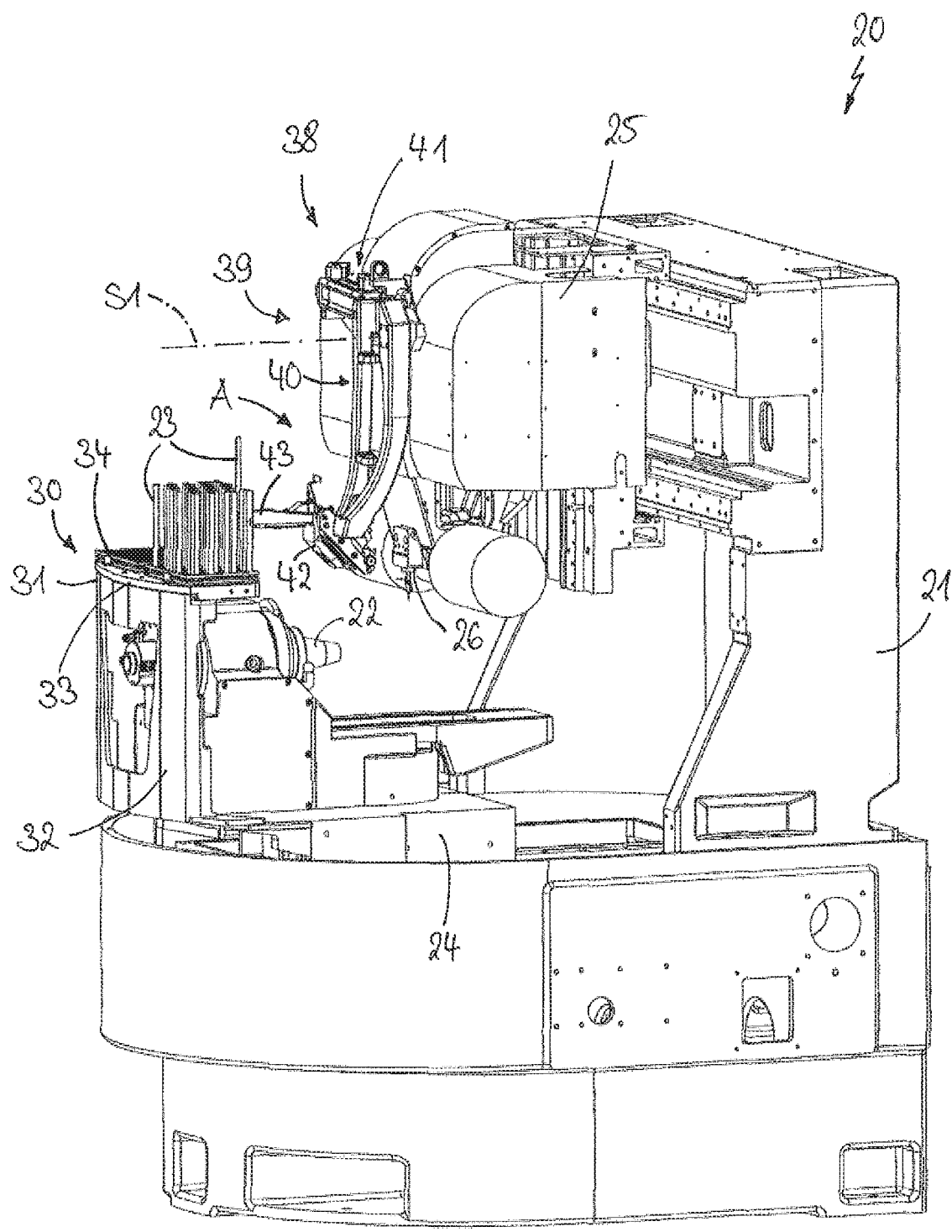
Figure 9:
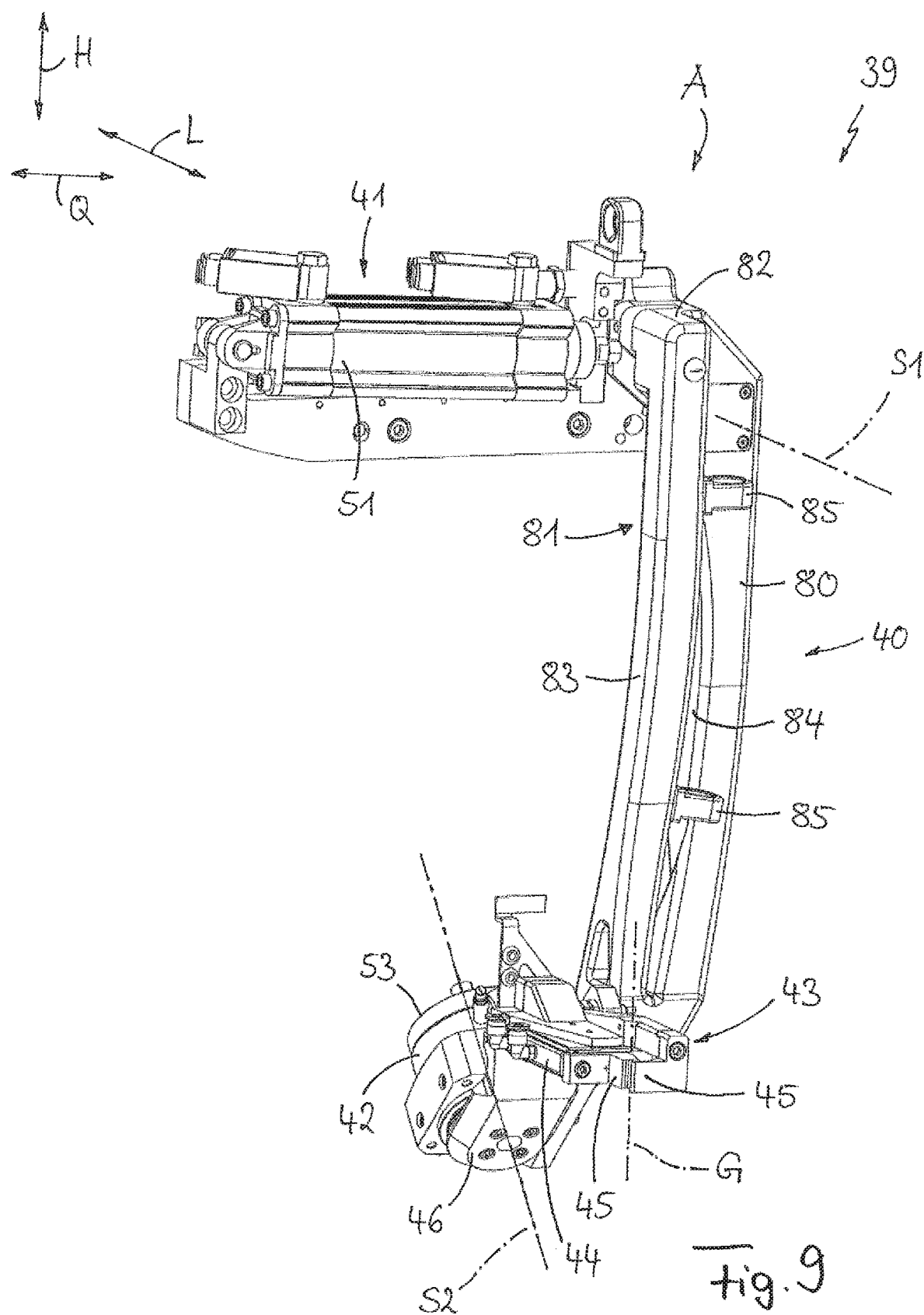

Advantageous embodiments of the invention can be inferred from the dependent patent claims, the description, as well as the drawings. Hereinafter, preferred exemplary embodiments of the transport device are explained in detail with reference to the appended drawings. They show in FIG. 1 a perspective view of a machine tool comprising a transport device for transporting a workpiece with a pivot arm that is in a rest position;

FIG. 2 the machine tool according to FIG. 1 with a pivot arm in working position;

FIGS. 3 to 7 the transport device for transporting the workpiece in different situations during the transport of a workpiece out of a workpiece carrier into a clamping chuck;

FIG. 8 a schematic diagram to explain the maximum distance of a clamping axis of the claming chuck from a point of intersection between a workpiece longitudinal axis and a second pivot axis;

FIG. 9 a perspective view of an exemplary embodiment of a gripper arrangement, wherein the pivot arm is in working position;

FIG. 10 the gripper arrangement according to FIG. 9, wherein the pivot arm is in a rest position; and FIG. 11 an exemplary embodiment of a pneumatic drive arrangement for operating the gripper arrangement.

FIGS. 1 and 2 show a machine tool 20. The machine tool 20 comprises a machine frame 21 on which several linear and/or rotary machine axles are provided. The machine tool 20 comprises a clamping chuck 22 for clamping in place a workpiece 23 that is to be machined. The clamping chuck 22 is arranged on a first machine slide 24 and can be shifted in a longitudinal direction L via the machine slide 24 by means of a linear machine axle.

A tool unit 26 is arranged on a second machine slide 25. In accordance with the example, the second machine slide 25 is configured as a cross-slide and can be linearly moved via two linear machine axles in a height direction H and/or in a transverse direction Q. The height direction H, the longitudinal direction L and the transverse direction Q each are perpendicular to each other at a right angle and form a Cartesian coordinate system of the machine tool 20.

In addition to the described linear axles, there may be one or more rotary machine axles. In the exemplary embodiment shown here, a rotary machine axle is provided between the clamping chuck 22 and the first tool slide 24, so that the clamping chuck 22 is arranged on the machine slide 24 in a manner such that it can be swiveled or pivoted about an axis extending in height direction H. The machine tool 20 may comprise up to six machine axles for any linear and rotary degree of freedom.

The workpieces 23 are at least sectionwise or completely rod-shaped and have a cylindrical contour. The cylindrical contour may have a cross-section that represents a circular cylinder or a polygon. The rod-shaped or cylindrical part of the workpiece forms a workpiece longitudinal axis W that is shown as an example by FIG. 3.

A workpiece carrier 30 that does not have any dedicated drives is arranged on the machine frame 21. The workpiece carrier 30 comprises a workpiece shelf 31 that may be mounted to the machine frame 21 or a machine bed. Considering the exemplary embodiment described here, the workpiece carrier 30 is mounted to the first machine slide 24. The distance between the workpiece carrier 30 from the clamping chuck 22 in longitudinal direction L remains preferably constant. The clamping chuck 22 and at least its opening is arranged in longitudinal direction L at a distance from the workpiece carrier 30.

The workpiece shelf 31 comprises a bearing structure or bearing wall 32 extending in height direction. On the upper side of the bearing wall 32 there is a shelf surface 33 on which at least one workpiece palette 34 may be arranged or mounted thereto. In the shown exemplary embodiment, two workpiece palettes 34 are arranged next to each other in transverse direction Q. One workpiece palette 34 is disposed for receiving non-machined workpieces whereas the other workpiece palette 34 receives already machined workpieces 23. The shelf 33 surface and the workpiece palettes 34 are above the clamping chuck 22, viewed in height direction H.

Each of the workpiece palettes 34 have a plurality of receiving spaces for the workpieces 23. The receiving spaces may be holes or openings in the workpiece palette 34. The holes form a cylindrical contour, wherein the longitudinal axis of the cylindrical contour, in accordance with the example, extends in height direction H or at least approximately in height direction H.

A transport device 38 is provided for transporting a workpiece 23 from the clamping chuck 22 into the workpiece carrier 30 and/or vice versa. The transport device 38 comprises a gripper arrangement 39 with a pivot arm 40. The pivot arm 40 is supported on one bearing end so as to be pivotable about a first pivot axis S1 on the second machine slide 25 by means of a first pivot drive 41. The pivot arm 40 can be moved between a rest position R (FIGS. 1 and 10) and a working position A (FIGS. 2 and 9) about the first pivot axis S1. In the rest position R, the pivot arm 40 extends essentially in transverse direction Q. In the working position A, the pivot arm 40 extends essentially in height direction H and, in accordance with the example, in downward direction—starting from the first pivot axis S1.

A second pivot drive 42 is arranged on the pivot arm on the free end opposite the bearing end. In the event of a pivoting movement of the pivot arm 40 about the first pivot axis S1, the pivot drive 42 moves on a circular path around the first pivot axis S1. The second pivot drive 42 connects a workpiece gripper 43 to the pivot arm 40. The workpiece gripper 43 is supported so as to be pivotable about a second pivot axis S2 of the second pivot drive 42 relative to the pivot arm 40. In accordance with the example, the first pivot axis S1 extends in longitudinal direction L. The second pivot axis S2 is inclined with respect to the first pivot axis S1 and the longitudinal direction L, respectively, by 45°. In the working position A of the pivot arm 40, the second pivot axis S2 extends in a plane that is defined by the height direction H and the longitudinal direction L. In the rest position R of the pivot arm 40, the pivot axis S2 extends in a plane that is defined by the longitudinal direction L and the transverse direction Q.

The workpiece gripper 43 has two gripper jaws 45 that can be moved relative to each over via a gripper drive 44. In doing so, one of the two gripper jaws 45 may be immovable relative to a holder 46 of the workpiece gripper 43, and the respectively other gripper jaw 45 may be movable relative to the holder 46 and relative to the other gripper jaw 45 within at least one degree of freedom and, preferably, one linear degree of freedom. In accordance with the example, one of the two gripper jaws 45 is supported by the holder 46 so as to be movable only within one degree of freedom, whereas the other gripper jaw 45 is permanently connected to the holder 46. The holder 46, in turn, can be pivoted about the second pivot axis S2 by means of the second pivot drive 42.

The workpiece gripper 43 and, in accordance with the example, the two gripper jaws 45 define a gripper axis G. The gripper axis G corresponds to the position of the workpiece longitudinal axis W that is taken by a workpiece 23 held by the gripper arrangement 43. In accordance with the example, the gripper axis G is defined by contact locations or clamping locations of the two gripper jaws 45 that extend parallel to the gripper axis G and are in contact with a workpiece 23 held by the gripper arrangement or the gripper jaws 45. For example, at least one of the gripper jaws may have a groove-shaped recess extending parallel to the gripper axis G, said recess having two surface sections that are inclined relative to each other and may have a V-shaped cross-section, for example. Consequently, the two gripper jaws 45 delimit a prismatic intermediate space and are able to grip the cylindrical sections of the workpiece 23.

In each position of the workpiece gripper 43, the gripper axis G extend inclined by 45° relative to the second pivot axis S2.

The gripper arrangement 39 is moved in a strictly pneumatic manner. The force for moving the movable parts is provided only by compressed air. The first pivot drive 41, as well as the second pivot drive 42, and also the gripper drive 44 are driven by compressed air.

FIG. 11 shows, in a greatly schematized and simplified manner, a basic circuit diagram for a pneumatic drive arrangement 50. The pneumatic drive arrangement 50 comprises a double-acting first pneumatic cylinder 51 of the first pivot drive 41, a double-acting second pneumatic cylinder 52 of the gripper drive 44, as well as a swivel vane unit 53 for the second pivot drive 42. The swivel vane unit 53 cannot be rotated by fully 360°. The maximum angle of rotation is at least 180°.

The pneumatic drive arrangement 50 has a compressed air source 54 to which a supply line 55 is connected. Furthermore, an exhaust air line 56 is provided for venting. A pressure-regulating unit 57 is connected to the supply line 55, said unit providing—on the output side—a pneumatic control pressure at a control line 58.

The supply line 55 and the exhaust air line 56 are connected to a pressure-controlled safety valve 59 that is configured as a two-way valve in the exemplary embodiment. In the mechanically biased rest position of the safety valve 59, the supply line 55 is blocked and the output of the safety valve 59 is connected to the exhaust air line 56. As soon as a pressure is applied to the supply line 55 by the compressed air source 54 the pressure-regulating unit 57 delivers a control pressure to the control line 58, and the safety valve 59 is switched into the unblocking position depicted in FIG. 11.

At the output of the safety valve the control pressure of the control line 58 is conveyed to the control inputs of two check valve arrangements 61 that can be unblocked. The check valves of the check valve arrangements 61 are thus unblocked and allow a flow of fluid in both flow directions. In the exemplary embodiment, the check valve arrangements 61 also comprise a restrictor, so that the fluid flow can be reduced in one or both flow directions. As is schematically illustrated, a check valve may be connected parallel to the respective restrictor, so that the restrictor acts only in one flow direction and is bridged in the respectively other flow direction by the check valve.

The first pneumatic cylinder 51 is connected to a control valve arrangement 66 via two pneumatic lines 65. Each pneumatic line 65 connects one output of the control valve arrangement 66 to one of the two working chambers of the first pneumatic cylinder 51. A check valve arrangement 61 is seated in each pneumatic line 65. In accordance with the example, thus the flow to the pneumatic cylinder 51 is made possible without restriction, whereas the backflow from the pneumatic cylinder 51 to the control valve arrangement 66 takes place via the respective restrictor of the check valve arrangement 61. This backflow is possible only when the check valve arrangements 61 are unblocked via the control inputs.

In the exemplary embodiment, the control valve arrangement 66 is configured as an electrically activatable three-way valve. The one input is connected to the supply line 55, whereas the other input is connected to the exhaust air line 56. In a neutral setting of the control valve arrangement 66, all the inputs and outputs are blocked. Due to a first switching signal SW1 and a second switching signal SW2 of a control arrangement 67, it is possible to switch the control valve arrangement 66 in two setting positions in which the one working chamber of the first pneumatic cylinder 51 is pneumatically connected to the supply line and the other working chamber to the exhaust air line 56. Consequently, the piston rod of the first pneumatic cylinder 51 can be moved in, moved out, or held in the current position, depending on the setting position. Due to the linear movement of the piston rod of the first pneumatic cylinder 51, the pivot arm can be pivoted about the first pivot axis S1. To do so, the piston rod of the first pneumatic cylinder 51 makes contact offset with respect to the first pivot axis S1 in the region of the baring end of the pivot arm 40 and can thus generate a torque about the first pivot axis S1 when the piston rod is moved in or moved out.

Analogous to the first pneumatic cylinder 51, the swivel vane unit 53 of the second pivot drive 42 and the double-acting second pneumatic cylinder 52 of the gripper drive 44 are also pneumatically connected—via respectively one control valve arrangement 66—to the supply line 55, as well as to the exhaust air line 56. Analogous to the first pneumatic cylinder 51, it is also possible to control the other pneumatic drive units 52, 53 by means of the respective control valve arrangement 66. To do so, the control arrangement 67 provides a third switching signal SW3, a fourth switching signal SW4 for the control valve arrangement 66 of the swivel vane unit 53, and a fifth switching signal SW5, as well as a sixth switching signal SW6 for the control valve arrangement 66 of the second pneumatic cylinder 52.

In accordance with the example, the pneumatic drive arrangement 50 comprises a locking arrangement 70 that is disposed to block the pivot arm 40 in its rest position R. As a result of this, it can be prevented that—due to a leak in a first pneumatic cylinder 51—a gradual lowering of the pivot arm out of its rest position R takes place. The locking arrangement 70 mechanically blocks the pivot arm 40 in its rest position R. To do so in accordance with the example, the locking arrangement 70 comprises a simply acting third pneumatic cylinder 71. By means of an application of pressure to the working chamber, the third pneumatic cylinder 71 can be moved into its unblocking position, so that a pivoting movement of the pivot arm 40 about the first pivot axis S1 is possible. As soon as there is insufficient pressure in the working chamber of the third pneumatic cylinder 71, the piston rod moves out and locks the pivot arm 40 in position when the latter is in its rest position R. To do so, the piston or the piston rod is mechanically biased in the locking position.

Another safety valve 59 is arranged between the working chamber of the third pneumatic cylinder and the supply line 55 or the exhaust air line 56. Both safety valves 59 are activated via the pneumatic control line 58 and connect their respective outputs to the supply line 55 when a pneumatic pressure exists in the control line 58. The two safety valves 59 can be reversed, independently of each other by a seventh switching signal SW7 or an eight switching signal SW8 of the control arrangement 67, into a position in which the output of the safety valve is connected to the exhaust air line 56. This position is also assumed by the safety valves 59 when the pneumatic pressure in the control line 58 drops below a minimum pressure.

Consequently, the control arrangement 67 is disposed to activate the pivot drives 41, 52 and the gripper drive 44 in order to pivot the pivot arm 40 about the first pivot axis S1 or to pivot the gripper arrangement 43 about the second pivot axis S2, or to close the gripper jaws for gripping a workpiece 23, or to open them for releasing a workpiece 23.

FIGS. 3 to 8 explain in detail the process during the transport of a workpiece between the workpiece carrier 30 and the clamping chuck 22.

It is assumed that—in the starting situation—there is no workpiece 23 clamped in the clamping chuck 22. Via the transport device 38, a not yet machined workpiece 23 is to be removed from the workpiece carrier 30 and clamped in place in the clamping chuck 22.

Initially, the pivot arm 40 of the gripper arrangement 39 is pivoted into the working position A. The workpiece gripper is in a first position I in which the gripper axis G is oriented at a right angle with respect to the first pivot axis S1 and extends approximately in height direction H. With the use of the machine axles the workpiece gripper 43 is moved to the workpiece 23 that is to be removed and is positioned in such a manner that the gripper axis G coincides with the workpiece longitudinal axis W of the workpiece 23 that is to be received. Subsequently, the workpiece 23 is clamped in place by shifting a gripper jaw 45.

Figure 3:
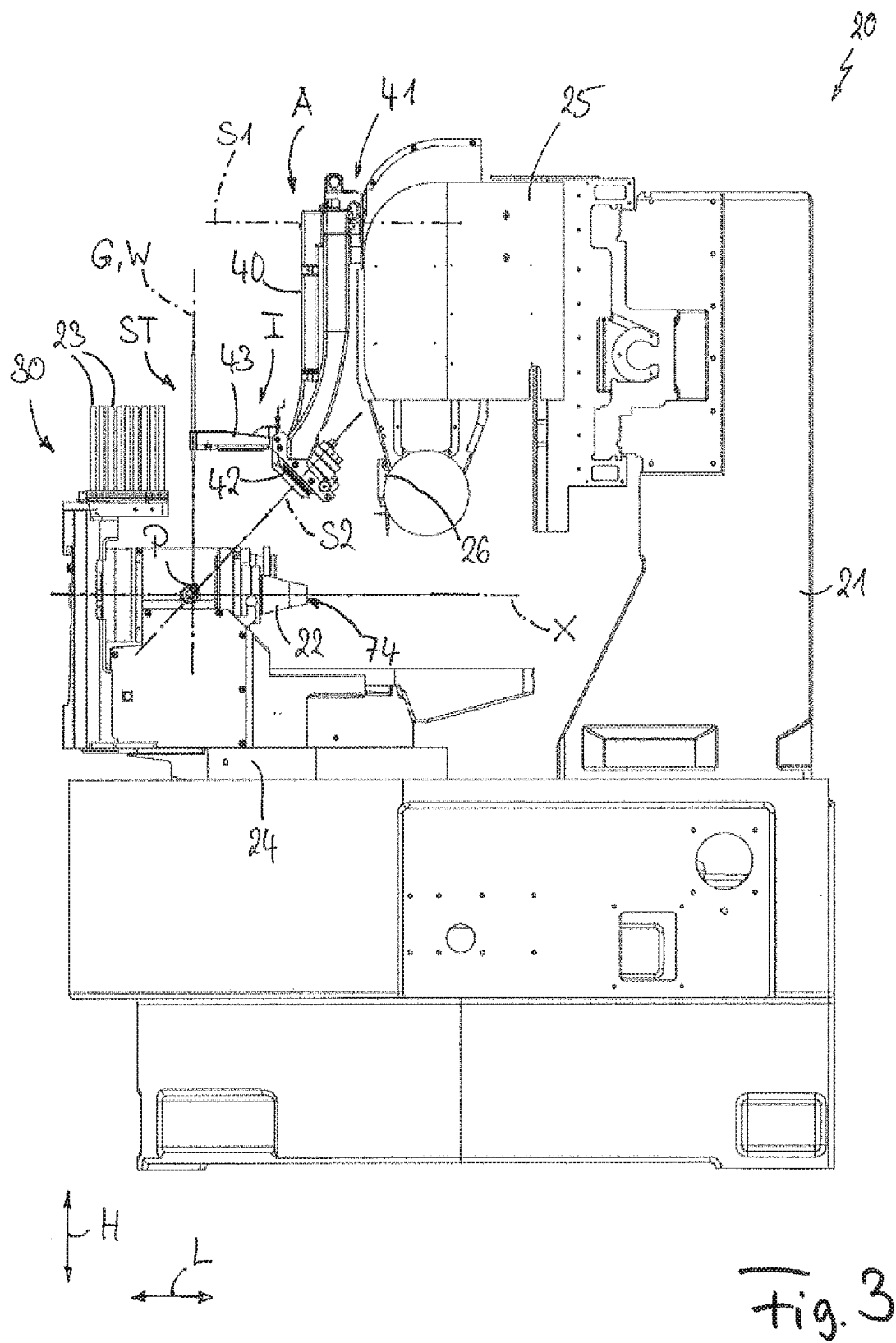

Via a machine axle the gripper arrangement 39 is lifted in height direction H so that the workpiece 23 is completely guided out of the hole of the workpiece palette 34. Subsequently, the workpiece gripper 43 is moved into a pivot transfer position ST by a movement of the machine axle in longitudinal direction L (FIG. 3). In doing so, the workpiece gripper 43 is still always in its first position I. In this first position I the second pivot axis S2 and the gripper axis G, or the workpiece longitudinal axis W of the workpiece 23 held by the workpiece gripper 43, form a point of intersection P. Different from the exemplary embodiment, it is also possible that the second pivot axis S2 be offset in transverse direction Q with respect to the gripper axis G, wherein then the point of intersection P is formed by the projection of a combined plane that is defined by the height direction H and the longitudinal direction L. The point of intersection P in the first position I of the workpiece gripper 43 and the pivot transfer position ST of the workpiece 23 are shown in FIG. 3.

The clamping chuck 22 defines a clamping axis X. A workpiece 23 that is clamped in the clamping chuck 22 in an ideal way has a workpiece longitudinal axis W that is in alignment with the clamping axis X. Thus, the clamping axis X is the center longitudinal axis of the clamping chuck 22.

In the pivot transfer position ST of the workpiece 23, the distance of the workpiece 23 in height direction H from the clamping axis S is at least as great as the distance of a clamping side 74 of the clamping chuck 22 from the gripper axis G or the workpiece longitudinal axis W of the workpiece 23 held in pivot transfer position ST, in which case the distance of the clamping side 74 from the gripper axis G is viewed along the clamping axis X. Thus it is ensured that—due to a pivoting movement of the second pivot drive 42 about the second pivot axis S2 by 180°—a collision of the workpiece 23 with the clamping chuck 22 is prevented.

As is schematically illustrated in FIG. 3, the pivot transfer position ST is ideally selected in such a manner that the clamping X extends through the point of intersection P. If this is the case, a pivoting movement by 180° about the second pivot axis S2 aligns the workpiece longitudinal axis W with the clamping axis X. At least this pivot transfer position ST is selected such that the point of intersection P and the clamping axis X are at a maximum distance dmax (FIG. 8). Viewed along the clamping axis X, the point of intersection P is located within a circular area having a radius dmax about the clamping axis X.

Figure 4:
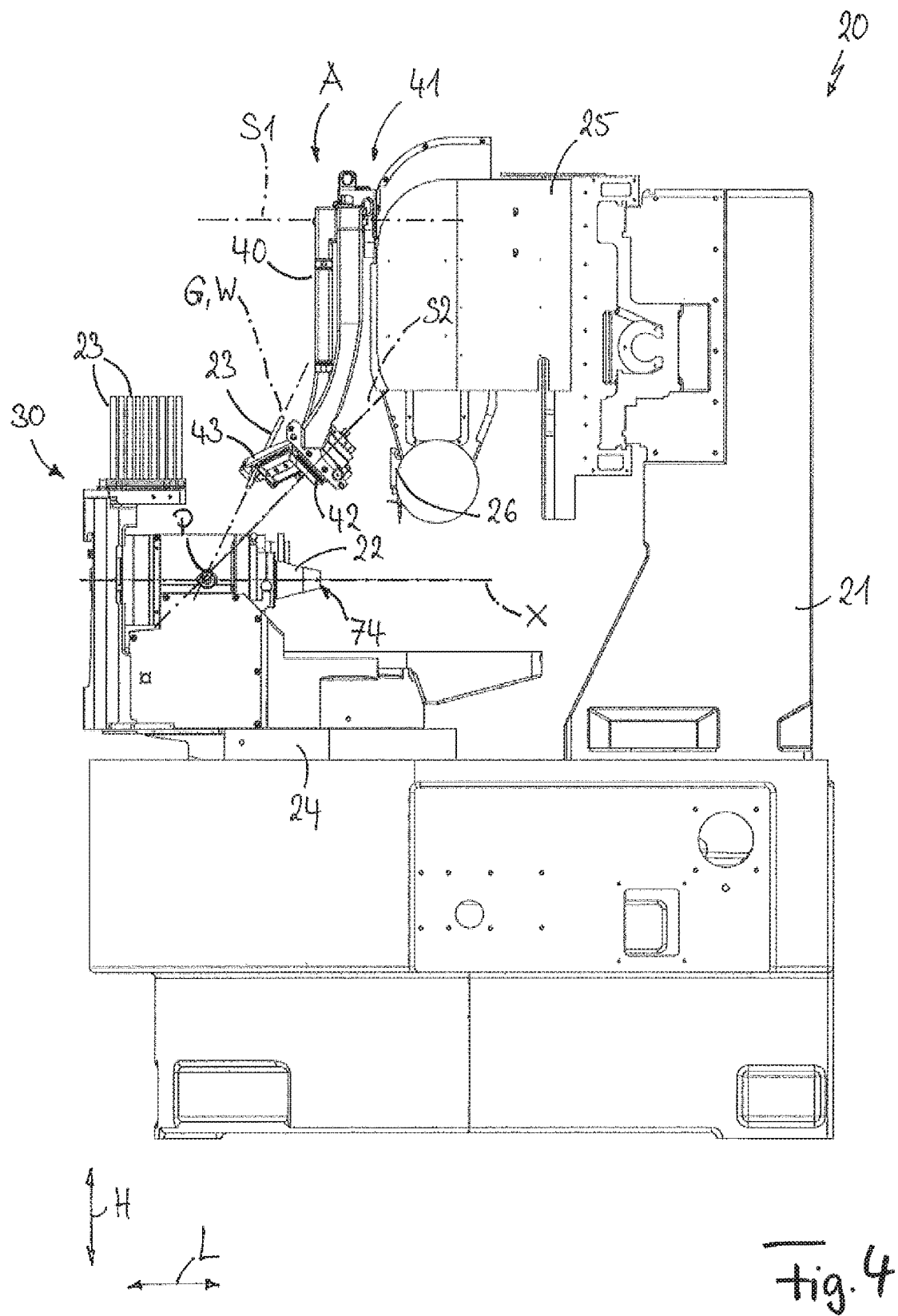
Figure 5:
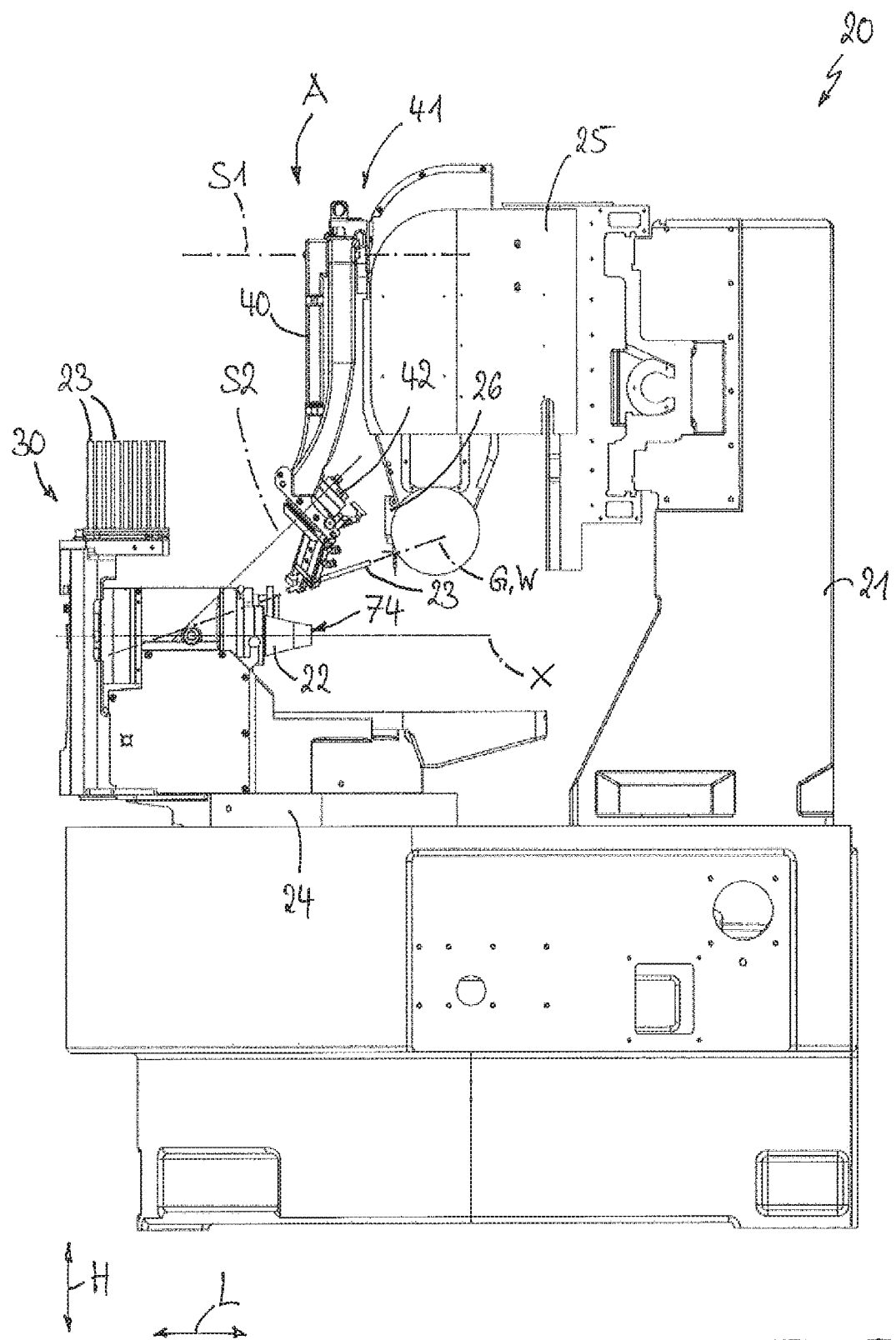
Figure 6:
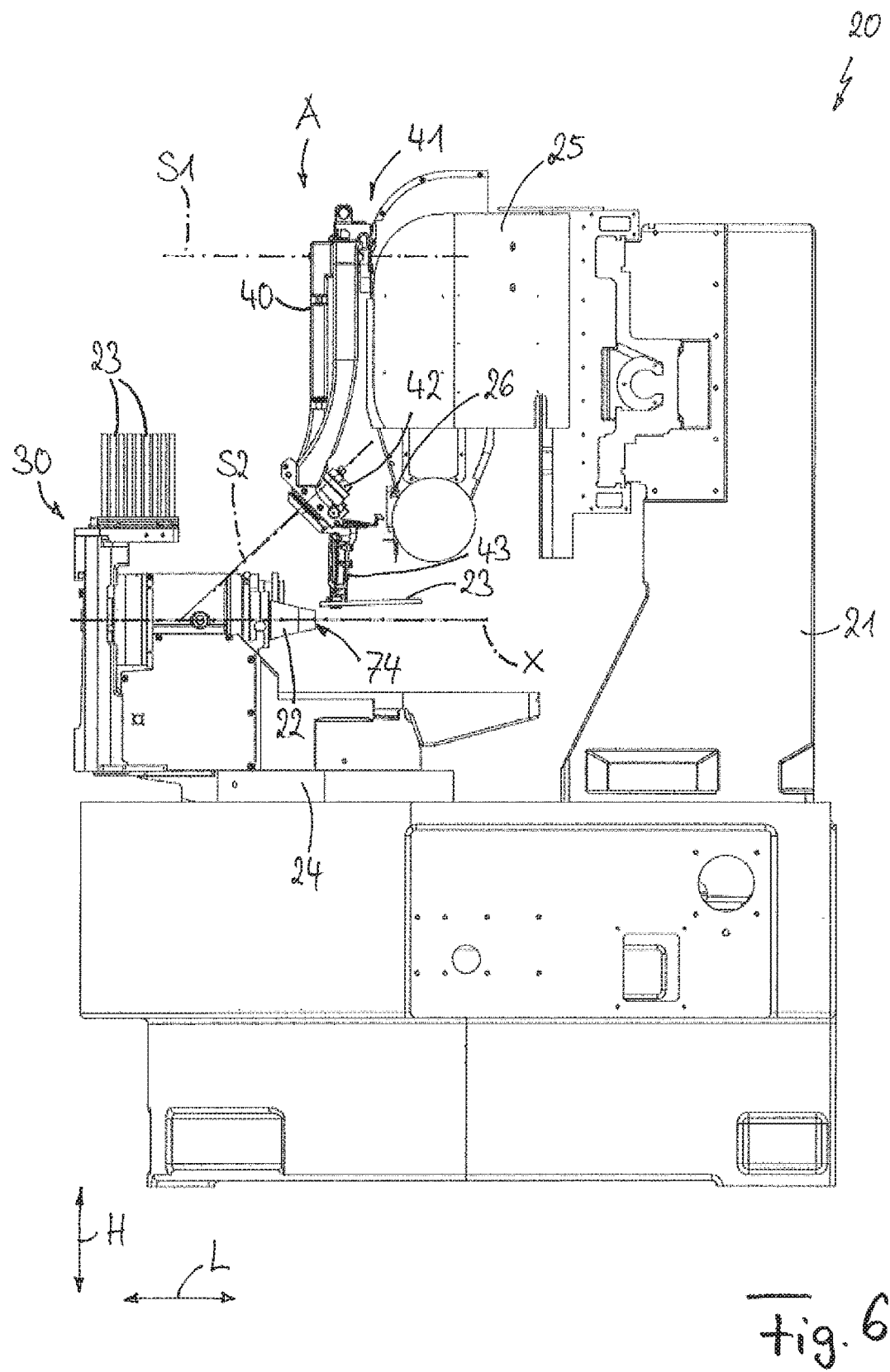

The workpiece 23 held by the workpiece gripper 43 is pivoted out of the pivot transfer position ST by means of the second pivot drive 42 about 180° about the second pivot axis S2. The progress of this pivoting movement is schematically illustrated in FIGS. 4 to 6. Preferably, all other machine axles of the machine tool 20 are stopped in this case.

After the rotation by 180° about the second pivot axis S2 has been completed, the workpiece gripper 43 assumes a second position II in which the gripper axis G is rotated by 90°, compared with the orientation in the first position I. The gripper axis G extends in the second position II in longitudinal direction L. The clamping axis X is oriented parallel to the longitudinal axis L. The workpiece 23 held by the workpiece gripper 43 was moved into the chuck transfer position FT (FIG. 7), starting from the pivot transfer position ST in FIG. 4. In accordance with the example, the workpiece longitudinal axis W extends parallel to or, ideally in alignment, with the clamping axis X.

In the exemplary situation described herein, it is possible in the chuck transfer position FT of the workpiece gripper 43, for a distance d to exist between the workpiece longitudinal axis W or the gripper longitudinal axis G, on the one hand, and the clamping axis X, on the other hand. This distance d is reduced for placing or clamping the workpiece 23 in the chuck by activating at least one of the machine axles of the machine tool 20 until the distance d equals zero or is at least within a specified tolerance. If linear machine axles are used for this equalizing movement, it may be sufficient to activate the linear machine axle for moving the clamping chuck 22 or the gripper arrangement 39 in height direction H. If there is also a deviation in transverse direction Q between the clamping axis X and the tool longitudinal axis W in the chuck transfer position FT, the second linear machine axle must additionally be activated. Preferably, the workpiece longitudinal axis W is already oriented in the pivot transfer position ST in such a manner that it intersects the clamping axis X and thus extends in a common plane that is defined by the height direction H and the longitudinal direction L. In this event, an equalizing movement is sufficient for the fine adjustment by a machine axle in height direction H, starting from the chuck transfer position FT.

As soon as the workpiece longitudinal axis W coincides exactly with the clamping axis X, it is possible with a linear movement of a machine axle in longitudinal direction L to insert the workpiece 23 in the clamping chuck 22 and clamp it in place there. The workpiece gripper 43 releases the workpiece 23 and is subsequently pivoted back into its first position I. Thereafter or at the same time, the pivot arm 40 in the first pivot axis S1 is pivoted into its rest position R. As soon as the rest position R is reached, the tool unit 26 may be used for machining the workpiece 23.

The progress of the transport of an already machined workpiece 23 from the clamping chuck 22 into the workpiece carrier 30 takes place in reverse order. After the machined workpiece 23 has been taken out of the clamping chuck 22 in longitudinal direction L, a 180° movement about the second pivot axis S2 is performed via the second pivot drive 42. The machine axles then deposit the machined workpiece 23 in the workpiece carrier 30. Subsequently, a not machined workpiece can be removed from the workpiece carrier 30 and inserted in the clamping chuck 22, consistent with the previously described process.

According to the example, the workpiece gripper 43 is monitored when the workpiece gripper 43 is in its second position II. In doing so, the workpiece gripper 43 is monitored in view of an approaching spurious contour and/or a pull or pressure in longitudinal direction L. Monitoring is accomplished, e.g., by means of at least one or two inductive sensors that are arranged on the workpiece gripper 43. Consequently, collisions of the workpiece gripper 43 with a spurious contour can be prevented, or any damage in the event of a collision or contact can be prevented or minimized.

In order to achieve exact positioning of the workpiece gripper 43 or the workpiece 23 held by the workpiece gripper 43, the pivot arm 40 must display sufficient flexural rigidity. In accordance with the example, the pivot arm 40 is formed by a first arm strut 80 and a second arm strut 8 that each may be configured as solid bodies or as hollow profile bodies having a rectangle-like cross-section, in accordance with the example. The two arm struts 80, 81 are connected to each other on the two ends of the pivot arm 40. The pivot bearing of the pivot arm 40 around the first pivot axis S1 is provided on the first arm strut 80. In the region of the pivot bearing for the first pivot axis S1, the second arm strut 81 has an end piece 82 that extends approximately in the direction of the first pivot axis S1. Adjoining this end piece 82 there is an arm section 83 that extends—starting from one end piece 82—toward the other free end of the pivot arm 40. Adjoining the end piece 82, the arm section 83 is offset parallel to the first pivot axis S1 relative to the first arm strut 80 and, in accordance with the example, is offset away from the first pivot drive 41 or the second machine slide 25. This offset is maintained over a length of the arm section 38 that corresponds at least to the length of the first pneumatic cylinder 51. The degree of the offset along this length of the arm section 38 is always greater than zero, however need not be constant.

Furthermore, the two arm struts 80, 81 are arranged next to each other, offset in one direction at a right angle with respect to the first pivot axis S1. In the working position A, the two arm struts 80,81 are arranged offset in transverse direction Q as a result of this. If the pivot arm 40 is in the rest position R, the two arm struts 80, 81 are arranged offset next to each other in height direction H.

A gap 84 is formed between the arm section 83 of the second arm strut 81 and the first arm strut 80. Adjacent to this gap 84 there may be arranged, on the arm section 83, fasteners 85 for pneumatic lines and/or electrical lines. The fasteners 85 extend away from the arm section 83 and, viewed in the direction of the first pivot axis S1, are located in front of the first arm strut 80.

The offset of the two arm struts 80, 81 in the direction of the first pivot axis S1 no longer exists on the free end of the pivot arm 40 where the second pivot drive 42 is located.

The two arm struts 80, 81 extend at least sectionwise in a curved manner between both ends. The configuration of the pivot arm 40 is consistent with the principle of a human lower arm bone that is also formed by two separate bones (ulna and radius).

As can be seen in FIG. 10, the gripper arrangement 39 requires only minimal design space in the rest position R of the pivot arm 40. The first arm strut 80—viewed in height direction H—is located below the first pneumatic cylinder 51 of the first pivot drive 41. The arm section 83 of the second arm strut 81—viewed in longitudinal direction—is arranged in front of the first pneumatic cylinder 51. The first pneumatic cylinder 51 is received, so to speak, in a region above the first arm strut 80 and behind the second arm strut 81.

Consequently, the offset progression of the two arm struts 80, 81 is achieved not only by a high flexural rigidity of the pivot arm 40 but, in addition, a space-saving arrangement in the rest position R of the pivot arm 40 can be achieved.

In order to dampen the movement of the pivot arm 40 when it reaches the rest position R or the working position A, end position dampers may be associated with the pivot arm 40 or the first pneumatic cylinder 51. The end position dampers may be configured as external shock absorbers and/or as internal end position dampers of the first pneumatic cylinder 51.

The invention relates to a transport device 38 for transporting a workpiece 23 between a clamping chuck 22 and a workpiece carrier 30. The transport device 38 comprises a gripper arrangement 39 with a pivot arm 40. One end of the pivot arm 40 is supported on the machine tool 20 and, in particular, a machine slide 25 via a first pivot drive 41 so as to be pivotable about a first pivot axis S1. On the other end, the pivot arm 40 supports a second pivot drive 42 that defines a second pivot axis S2. A workpiece gripper 43 is supported so as to be pivotable about this second pivot axis S2. The two pivot axes are inclined by 45° relative to each other. A workpiece 23 held by the workpiece gripper 43 has a workpiece longitudinal axis W that extends in a first position I of the workpiece gripper 43 at a right angle with respect to the pivot axis S1. In a second position II of the workpiece gripper 43, the workpiece longitudinal axis W is oriented parallel to the first pivot axis S1. The workpiece longitudinal axis W of the workpiece 23 held by the workpiece gripper 43 is inclined by 45° relative to the second pivot axis S2.

LIST OF REFERENCE SIGNS

20 Machine tool
21 Machine frame
22 Clamping chuck
23 Workpiece
24 First machine slide
25 Second machine slide
26 Tool unit
30 Workpiece carrier
31 Workpiece shelf
32 Baring wall
33 Shelf surface
34 Workpiece palette
38 Transport device
39 Gripping device
40 Pivot arm
41 First pivot drive
42 Second pivot drive
43 Workpiece gripper
44 Gripper drive
45 Gripper jaw
46 Holder
50 Pneumatic drive arrangement
51 First pneumatic cylinder
52 Second pneumatic cylinder
53 Swivel vane unit
54 Compressed air source
55 Supply line
56 Exhaust air line
57 Pressure-regulating unit
58 Control line
59 Safety valve
60 Non-return line
61 Check valve arrangement
65 Pneumatic line
66 Control valve arrangement
67 Control arrangement
70 Locking arrangement
71 Third pneumatic cylinder
74 Clamping side
80 First arm strut
81 Second arm strut
82 End piece
83 Arm section
84 Gap
85 Fastener
I First position
II Second position
A Working position
dmax Maximum distance
FT Chuck transfer position
G Gripper axis
H Height direction
L Longitudinal direction
P Point of intersection
Q Transverse direction
R Rest position
S1 First pivot axis
S2 Second pivot axis
ST Pivot transfer position
W Workpiece longitudinal axis
X Clamping axis

The invention claimed is:

1. A transport device for transporting at least a sectionwise rod-shaped workpiece that has a workpiece longitudinal axis between a clamping chuck and a workpiece carrier in a machine tool, the transport device comprising:
a gripper arrangement including a pivot arm that is arranged, on one end, on a first pivot drive, such that the pivot arm is pivotally supported on the machine tool so as to be pivotable about a first pivot axis and the pivot arm has, on its other end, a second pivot drive on which a workpiece gripper for gripping the workpiece is pivotally supported so as to be pivotable about a second pivot axis, the workpiece gripper defining a gripper axis that is inclined by 45° to the second pivot axis in each position of the gripper axis as it pivots about the second pivot axis, and the gripper axis coincides with the workpiece longitudinal axis when the workpiece is held by the workpiece gripper;
a control arrangement for activating the first and second pivot drives;
wherein the first pivot axis extends in a longitudinal direction and the second pivot axis is inclined by 45° relative to the longitudinal direction;
wherein the workpiece gripper is moved between a first position and a second position by the second pivot drive, which pivots the workpiece gripper about the second pivot axis;
wherein the workpiece longitudinal axis extends, in the first position of the workpiece gripper, at a right angle with respect to the longitudinal direction and extends, in the second position of the workpiece gripper, parallel to the longitudinal direction; and
wherein the distance of the workpiece gripper from the first pivot axis in the first position is smaller than in the second position.

2. The transport device according to claim 1, wherein the workpiece carrier has several receiving spaces for one workpiece, respectively, said spaces being arranged in such a manner that the workpiece longitudinal axis of a workpiece arranged in a receiving space extends approximately in a height direction that is oriented at a right angle with respect to the first pivot axis.

3. The transport device according to claim 1, wherein the gripper axis is oriented, in the first position, parallel to the workpiece longitudinal axis of a workpiece arranged in a receiving space of the workpiece carrier.

4. The transport device according to claim 1, wherein the pivot arm is arranged by the first pivot drive on a machine slide of the machine tool, said slide being movable by at least one machine axle within one degree of freedom, respectively, relative to the clamping chuck and the workpiece carrier.

5. The transport device according to claim 4, wherein the at least one machine axle is provided for moving the clamping chuck within one degree of freedom, respectively, relative to the pivot arm.

6. The transport device according to claim 4, wherein the control arrangement is disposed to activate the at least one machine axle for transporting the workpiece.

7. The transport device according to claim 6, wherein the control arrangement is disposed to transport a workpiece, that has been removed from the workpiece carrier, by at least one machine axle into a pivot transfer position, in which the workpiece longitudinal axis and the second pivot axis form a point of intersection.

8. The transport device according to claim 7, wherein a clamping axis of the clamping chuck intersects the formed point of intersection or is at a maximum distance from the point of intersection.

9. The transport device according to claim 7, wherein the control arrangement is disposed to move the workpiece positioned in the pivot transfer position by a pivoting movement due to the second pivot drive into a chuck transfer position, in which the workpiece longitudinal axis is oriented parallel to a clamping axis of the clamping chuck.

10. The transport device according to claim 7, wherein the distance of the workpiece, arranged in the pivot transfer position, from a clamping axis of the clamping chuck in a height direction is at least as great as the distance of a clamping side of the clamping chuck from the workpiece longitudinal axis along the clamping axis.

11. The transport device according to claim 1, wherein the pivot arm has two arm struts separated from each other by a gap, said arm struts being connected to each other on both ends of the pivot arm.

12. The transport device according to claim 11, wherein the arm struts are arranged offset at least along a section in longitudinal direction and/or in a direction radial to the first pivot axis.

13. The transport device according to claim 11, wherein the arm struts extend in an arcuate manner between both ends of the pivot arm.

14. The transport device according to claim 11, wherein the arm struts are arranged, in a rest position of the pivot arm, adjacent to a pneumatic cylinder of the first pivot drive.

15. A machine tool, comprising:
   a first machine slide configured for linear movement in a first longitudinal direction;
   a second machine slide configured for linear movement in a second height direction and a third transverse direction, the first longitudinal direction, the second height direction and the third transverse direction each being perpendicular to each other;
   a transport device operably coupled to the second machine slide, the transport device configured to transport at least a sectionwise rod-shaped workpiece that has a workpiece longitudinal axis between a clamping chuck and a workpiece carrier of the machine tool, the transport device comprising:
      a gripper arrangement including a pivot arm that is arranged, on one end, on a first pivot drive, such that the pivot arm is pivotally supported on the machine tool so as to be pivotable about a first pivot axis and the pivot arm has, on its other end, a second pivot drive on which a workpiece gripper for gripping the workpiece is pivotally supported so as to be pivotable about a second pivot axis, the workpiece gripper defining a gripper axis that is inclined by 45° to the second pivot axis in each position of the gripper axis as it pivots about the second pivot axis, and the gripper axis coincides with the workpiece longitudinal axis when the workpiece is held by the workpiece gripper;
   a control arrangement for activating the first and second pivot drives;
   wherein the first pivot axis extends in a longitudinal direction and the second pivot axis is inclined by 45° relative to the longitudinal direction;
   wherein the workpiece gripper is moved between a first position and a second position by the second pivot drive, which pivots the workpiece gripper about the second pivot axis;
   wherein the workpiece longitudinal axis extends, in the first position of the workpiece gripper, at a right angle with respect to the longitudinal direction and extends, in the second position of the workpiece gripper, parallel to the longitudinal direction; and
   wherein the distance of the workpiece gripper from the first pivot axis in the first position is smaller than in the second position.

16. The machine tool as in claim 15, wherein the clamping chuck is arranged on the first machine slide.

17. The machine tool as in claim 15, wherein the first pivot drive is arranged on the second machine slide.

18. The machine tool as in claim 15, wherein the workpiece carrier is arranged on the first machine slide.

19. The machine tool as in claim 15, further comprising a machine frame, wherein the first machine slide and the second machine slide are arranged on the machine frame.

20. The machine tool as in claim 15, wherein the first pivot drive and the second pivot drive are driven by compressed air.

* * * * *